US012654612B2

(12) United States Patent
Hidaka et al.

(10) Patent No.: US 12,654,612 B2
(45) Date of Patent: Jun. 16, 2026

(54) CLAMP ATTACHMENT STRUCTURE FOR VEHICLE AND CLAMP OPERATION METHOD

(71) Applicant: KAWASAKI MOTORS, LTD., Akashi (JP)

(72) Inventors: Kota Hidaka, Akashi (JP); Brad Kathol, Lincoln, NE (US); Justin Olson, Lincoln, NE (US); Daisuke Saeki, Lincoln, NE (US); Hidefumi Yasuhara, Akashi (JP)

(73) Assignee: Kawasaki Motors, Ltd., Akashi (JP)

( * ) Notice: Subject to any disclaimer, the term of this patent is extended or adjusted under 35 U.S.C. 154(b) by 464 days.

(21) Appl. No.: 18/329,686

(22) Filed: Jun. 6, 2023

(65) Prior Publication Data

US 2024/0409020 A1 Dec. 12, 2024

(51) Int. Cl.
  *B60P 7/00* (2006.01)
  *B60P 7/08* (2006.01)
(52) U.S. Cl.
  CPC ................................. *B60P 7/0807* (2013.01)

(58) Field of Classification Search
  CPC ................. B60P 7/0807; B62M 27/02; B62M 2027/028; B60R 9/06
  USPC ......................................................... 410/106
  See application file for complete search history.

(56) References Cited

U.S. PATENT DOCUMENTS

| | | | |
|---|---|---|---|
| 8,777,531 B2 | 7/2014 | Massicotte et al. | |
| 9,505,335 B2* | 11/2016 | Massicotte | B60R 9/06 |
| 2011/0259931 A1* | 10/2011 | Rellergert | B60R 9/06 |
| | | | 224/401 |

* cited by examiner

*Primary Examiner* — Steven O Douglas

(74) *Attorney, Agent, or Firm* — BURR PATENT LAW, PLLC

(57) ABSTRACT

A clamp attachment structure for a vehicle, wherein the vehicle includes a fixing supporter to which a fixing object is fixed and which includes a fixing hole to fix the fixing object and a standby supporter disposed at a different position from the fixing supporter and including a standby hole. A clamp is attached to and detached from the fixing hole or the standby hole by quick operation.

18 Claims, 6 Drawing Sheets

F I G. 1
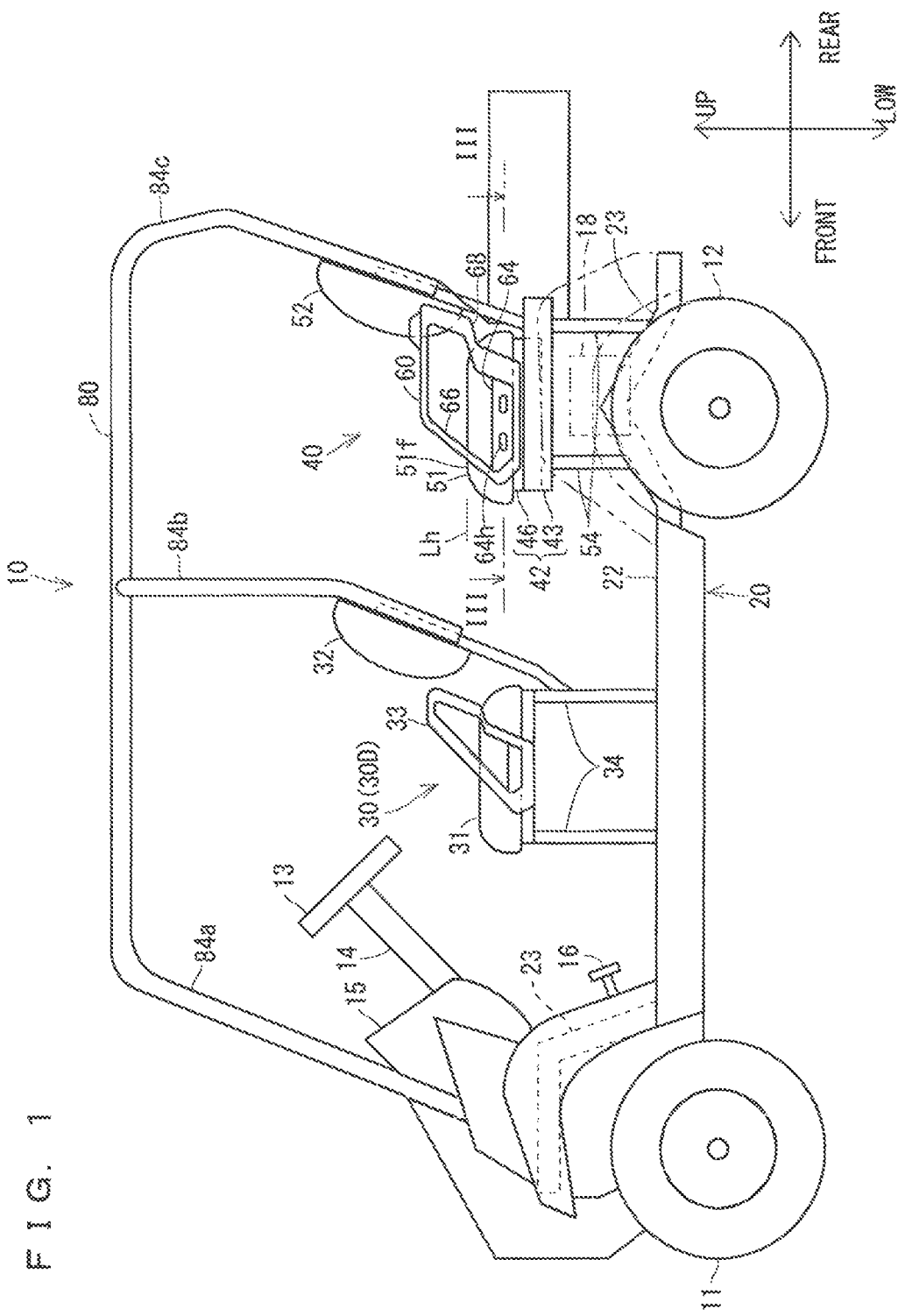

F I G. 3
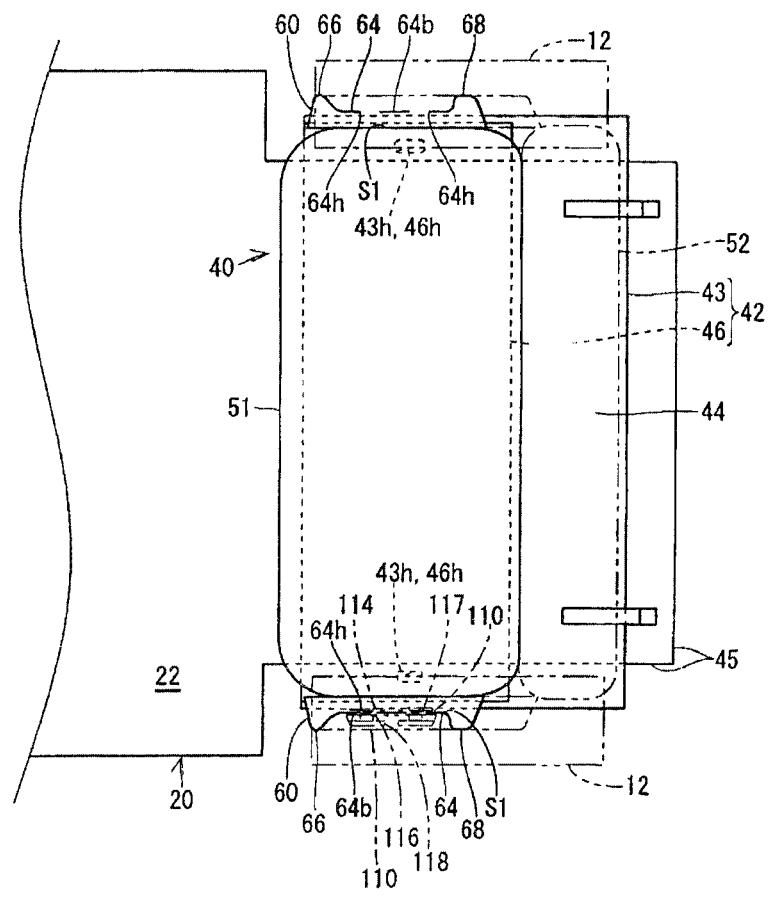
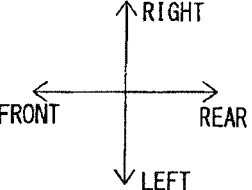

F I G.  4
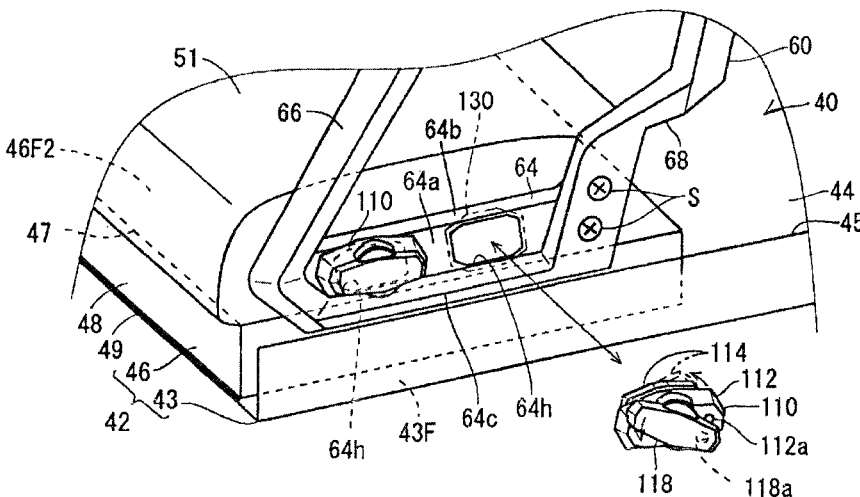
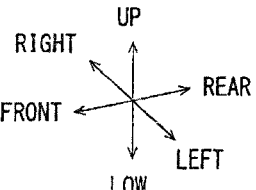
UP
RIGHT
REAR
FRONT
LEFT
LOW

F I G . 5

F I G. 6
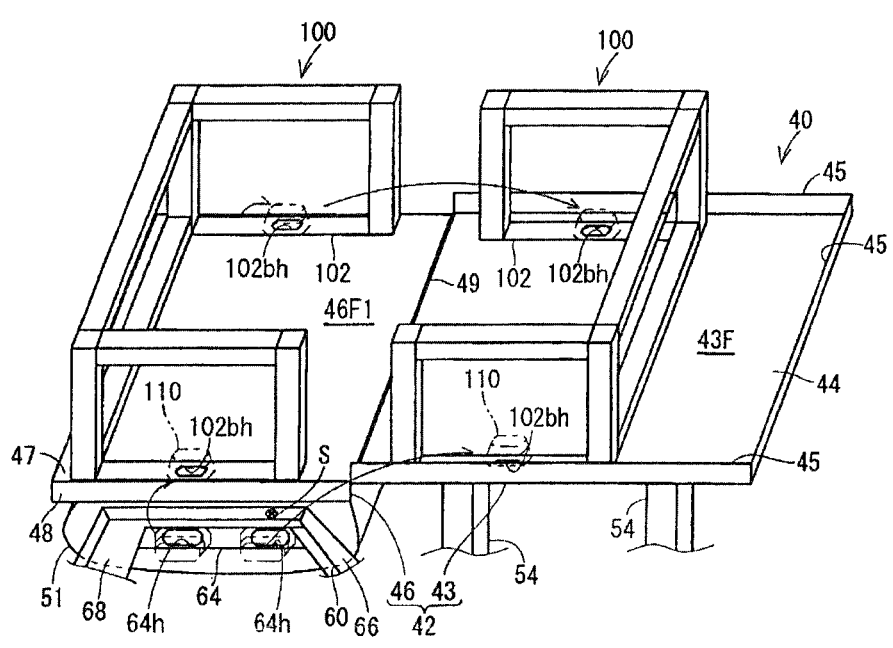
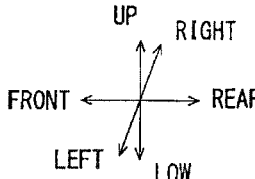

CLAMP ATTACHMENT STRUCTURE FOR VEHICLE AND CLAMP OPERATION METHOD

BACKGROUND OF THE INVENTION

Field of the Invention

The present disclosure relates to clamp attachment structures for vehicles and clamp operation methods, for example.

Description of the Background Art

U.S. Pat. No. 8,777,531 B2 discloses anchors for use in transporting items on a vehicle.

SUMMARY

A clamp attachment structure for a vehicle is a clamp attachment structure for a vehicle, wherein the vehicle includes a fixing supporter to which a fixing object is fixed and a standby supporter disposed at a different position from the fixing supporter, the fixing supporter including a fixing hole to fix the fixing object, the standby supporter including a standby hole, and a clamp is attached to and detached from the fixing hole or the standby hole by quick operation.

According to the clamp attachment structure, a space extending above a supporting surface of the fixing supporter can effectively be used in a case where the fixing object is not fixed to the fixing supporter. Furthermore, the clamp is less likely to be lost when being attached to the standby hole.

A clamp operation method is a clamp operation method for a vehicle, wherein, with a fixing object being fixed to a fixing supporter, a clamp is attached to a fixing hole of the fixing supporter by quick operation to fix the fixing object to the fixing supporter using the clamp, and, with the fixing object being detached from the fixing supporter, the clamp is attached to a standby hole of a standby supporter by quick operation.

According to the clamp operation method, the clamp can be attached to the fixing hole by quick operation to fix the fixing object to the fixing supporter. With the fixing object being detached from the fixing supporter, the clamp can be attached to the standby hole by quick operation. The space extending above the supporting surface of the fixing supporter can thus effectively be used in a case where the fixing object is not fixed to the fixing supporter. Furthermore, the clamp is less likely to be lost when being attached to the standby hole.

These and other objects, features, aspects and advantages of the present disclosure will become more apparent from the following detailed description when taken in conjunction with the accompanying drawings.

BRIEF DESCRIPTION OF THE DRAWINGS

FIG. 1 is a side view illustrating a vehicle with a second seat being in a seatable state;

FIG. 3 is a schematic cross-sectional view taken along the line III-III in FIG. 1;

FIG. 4 is a perspective view illustrating one side portion of the second seat;

FIG. 5 is a schematic perspective view illustrating a state of an extension base being disposed at an unfolded position: and FIG. 6 is a schematic perspective view illustrating a state of the extension base being disposed at the unfolded position.

DESCRIPTION OF THE PREFERRED EMBODIMENTS

Figure 2:
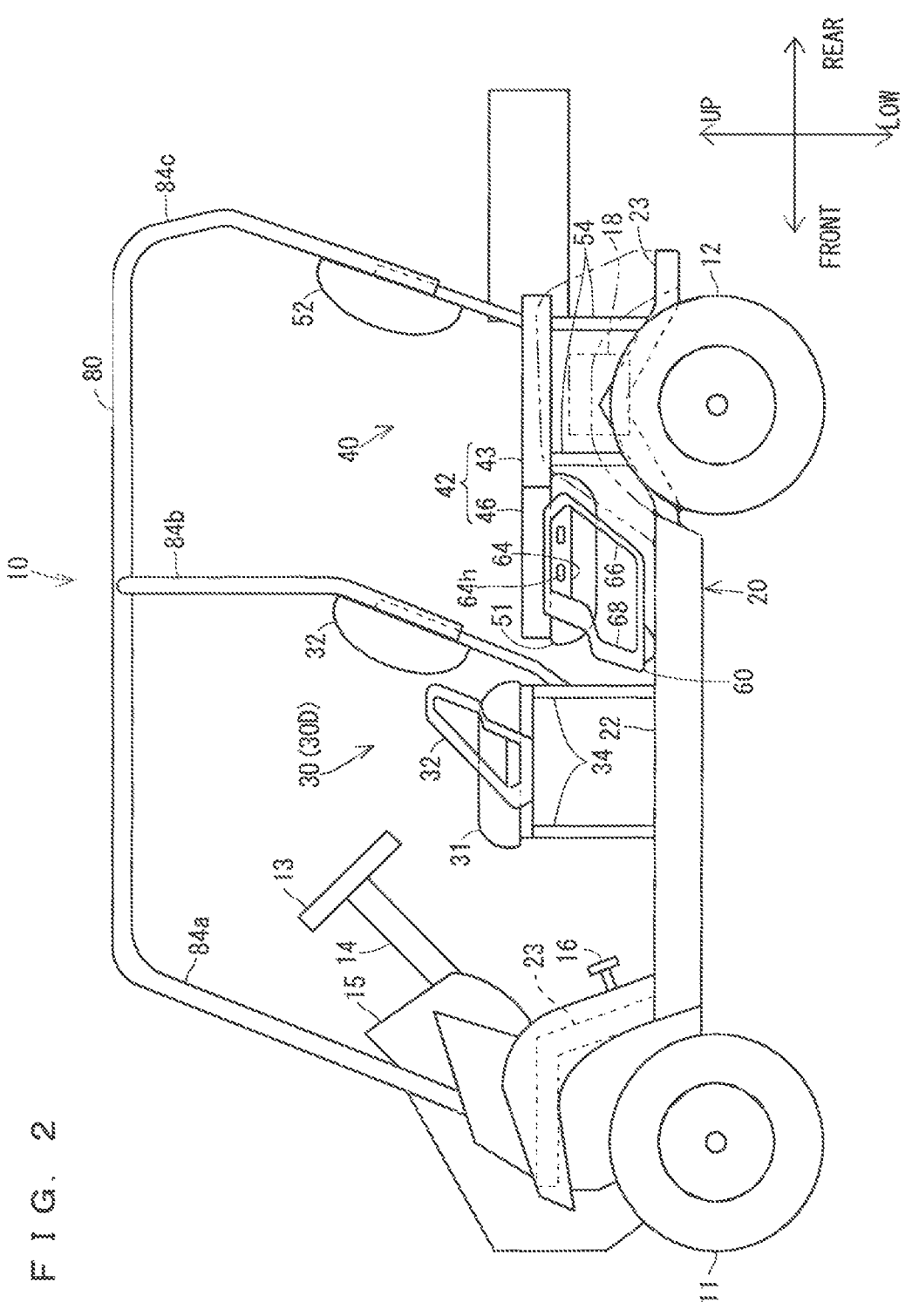
FIG. 2 is a side view illustrating the vehicle with the second seat being in a cargo bed state.

A clamp attachment structure for a vehicle and a clamp operation method according to an embodiment will be described below. FIG. 1 is a side view illustrating a vehicle 10.

The vehicle 10 may be a wheeled vehicle 10. The wheeled vehicle 10 may be an all-terrain vehicle (ATV), for example.

The vehicle is not necessarily required to be the ATV. The vehicle may be a motorcycle, a passenger transport vehicle (PTV), and a personal watercraft (PWC).

The wheeled vehicle 10 includes a vehicle body 20, a first seat 30, and a second seat 40. In description made below, a direction of travel of the wheeled vehicle 10 is also referred to as a forward direction, a direction opposite the forward direction is also referred to as a rearward direction, a direction toward a road surface on which the wheeled vehicle 10 travels is also referred to as a downward direction, and a direction opposite the downward direction is also referred to as an upward direction. Left and right are sometimes referred to in a state of facing forward while standing on the road surface. A left-right direction is a vehicle width direction.

The vehicle body 20 includes a floor 22. The floor 22 is located at the bottom of an occupant space for occupants. The floor 22 is a portion including a surface which supports feet of an occupant during travel and on which the occupant places his/her feet for movement during entry and exit. The floor 22 also supports the first seat 30.

The floor 22 is a plate-like portion extending horizontally. The floor 22 may be a floor plate or a combination of a vehicle body frame and the floor plate. The vehicle body may be a monocoque structure. In this case, the floor is a portion located below the occupant space for occupants of the vehicle body as the monocoque structure, the first seat, and the second seat.

The wheeled vehicle 10 further includes front wheels 11 and rear wheels 12.

For example, support frames 23 extend from the front and the rear of the floor 22. Two front wheels 11 are rotatably supported by a support frame 23 extending forward from the front of the floor 22. The front wheels 11 are located forward of the floor 22. The front wheels 11 may be supported to be rotatable around a steering axis extending vertically or inclined with respect to a vertical direction. The number of front wheels 11 may be one. Two rear wheels 12 are rotatably supported by a support frame 23 extending rearward from the rear of the floor 22. The rear wheels 12 are located rearward of the floor 22.

A steering wheel 13 is located at a position rearward of the front wheels 11. The steering wheel 13 is rotatably supported by a steering shaft 14. The steering wheel 13 is located on a front side above the floor 22. The steering wheel 13 is located forward of the first seat 30. The steering shaft 14 is connected to the front wheels 11 via a steering gear and the like. The front wheels 11 are rotated around the steering axis by operation of the steering wheel 13. Rotation of the front wheels 11 around the steering axis changes the direction of travel of the wheeled vehicle 10.

An instrument panel 15 on which a speedometer, a battery indicator, and the like are displayed may be installed forward of the steering wheel 13. An operation pedal 16 may be installed at a position below the steering wheel 13. The operation pedal 16 includes a brake pedal and an accelerator pedal, for example.

The wheeled vehicle 10 includes a motor for travel. The motor may be an electric motor 18 or an internal combustion engine. A rotating shaft of the motor is connected to a shaft for the rear wheels 12 directly or via a gear. Rotational driving force of the internal combustion engine is transferred to the rear wheels 12 so that the wheeled vehicle 10 can travel. The motor may be located below the second seat 40, for example. The motor may be located between the two rear wheels 12.

The first seat 30 is a seat located above the floor 22 and rearward of the instrument panel 15. In the present embodiment, the first seat 30 is a front seat located forward of the second seat 40. The first seat 30 includes a driver seat 30D. The driver seat 30D is a seat located rearward of the steering wheel 13. A driver can be seated on the driver seat 30D to operate the steering wheel 13.

The first seat 30 may include a seat on which another occupant can be seated next to the driver. In the present embodiment, the first seat 30 has a width that allows two occupants including the driver to be seated.

The first seat 30 includes a seat 31 and a backrest 32. The first seat 30 is supported above the floor 22 by a seat support frame 34 protruding upward from the floor 22, for example. A seating surface of the seat 31 faces upward. The backrest 32 is located above and rearward of the seat 31. The back of an occupant seated on the seat 31 is supported by the backrest 32 from behind. The first seat 30 may include an armrest 33 for the seated occupant to place his/her elbow.

The second seat 40 is located away from the first seat 30 at a position rearward of the first seat 30. The second seat 40 includes a seat base 42, a seat 51, and a backrest 52.

The seat base 42 is supported at a position above the floor 22 by a seat support frame 54 provided to stand on a portion of the vehicle body 20 between the two rear wheels 12, for example. The seat 51 is supported on the seat base 42. A seating surface of the seat 51 faces upward. The seat 51 may be formed to be long in the left-right direction so that occupants can be seated.

The backrest 52 is located above and rearward of the seat 51. The seat 51 faces away from the rear wheels 12. The seat 51 opposes a top frame 80. The back of an occupant seated on the seat 51 is supported by the backrest 52 from behind. The second seat 40 may include an armrest 60 for the seated occupant to place his/her elbow.

It is contemplated that a front-rear length of the armrest 33 of the first seat 30 is set to be shorter than a front-rear length of the armrest 60 of the second seat 40 not to obstruct entry and exit of an occupant.

It is contemplated that the instrument panel 15 and the steering wheel 13 protrude rearward, for example. In this case, it is contemplated that an occupant attempting to be seated on the first seat 30 enters between the seat 31 and the instrument panel 15 from outside the wheeled vehicle 10 while bringing his/her upper body closer to the backrest 32. It is thus contemplated that a distance between a front end of the seat 31 and a front end of the armrest 33 is set to be larger than a distance between a front end of the seat 51 and a front end of the armrest 60 of the second seat 40 to suppress interference of the front of the armrest 33 with the occupant attempting to enter forward of the seat 31.

It is also contemplated that an occupant attempting to be seated on the second seat 40 enters between the first seat 30 and the seat 51 while bringing his/her body closer to the backrest 32 of the first seat 30 near a left or right entrance of the wheeled vehicle 10, for example. It is thus contemplated that a distance between a rear end of the seat 31 and a rear end of the armrest 33 is set to be larger than a distance between a rear end of the seat 51 and a rear end of the armrest 60 of the second seat 40 to suppress interference of the rear of the armrest 33 with the occupant attempting to enter forward of the seat 51.

The wheeled vehicle 10 may include the top frame 80 and pillar frames 84a, 84b, and 84c.

The top frame 80 includes a frame extending in a front-rear direction at a position above the first seat 30 and the second seat 40. In the present embodiment, the top frame 80 extends to connect upper ends of the pillar frames 84a, 84b, and 84c. The top frame 80 may include a frame extending in the left-right direction.

The pillar frames 84a, 84b, and 84c are frames supporting the top frame 80. In the present embodiment, the pillar frames 84a, 84b, and 84c include a front pillar frame 84a, an intermediate pillar frame 84b, and a rear pillar frame 84c. The front pillar frame 84a extends upward from left and right portions of the vehicle body 20 forward of the first seat 30. The intermediate pillar frame 84b extends upward from the backrest 32 of the first seat 30. The rear pillar frame 84c extends upward from below at a position rearward of the backrest 52 of the second seat 40. A lower end of the rear pillar frame 84c is fixed to a portion of the wheeled vehicle 10 below the backrest 52. The lower end of the rear pillar frame 84c may be fixed to the seat base 42 or the support frame 23 extending from the rear of the floor 22.

The rear pillar frame 84c extends vertically at a position rearward of the seat 51. The backrest 52 of the second seat 40 is fixed to the rear pillar frame 84c at a position above and rearward of the seat 51. The seat 51 can thus be moved while the backrest 52 is disposed at a fixed position.

The wheeled vehicle 10 does not include a body covering left and right sides of the vehicle body 20. As described above, the pillar frames 84a, 84b, and 84c are not located outward in the vehicle width direction of a space between the first seat 30 and the second seat 40. Openings for entry and exit are thus always open outward in the vehicle width direction of the space between the first seat 30 and the second seat 40. An occupant entering and exiting the second seat 40 can thus enter through one of the left and right openings for entry and exit, pass through the space between the first seat 30 and the second seat 40, and exit through the other one of the left and right openings for entry and exit.

The openings for entry and exit being always open refers to the openings for entry and exit being open without being blocked by a door or a wall preventing entry and exit. The openings for entry and exit may thus be covered with a soft sheet for weather protection, for example.

The number of pillar frames 84a, 84b, and 84c is arbitrary. The intermediate pillar frame 84b may thus be omitted, for example.

FIG. 2 is a side view illustrating the vehicle 10. A state of the second seat 40 is changed between FIG. 1 and FIG. 2. The second seat 40 is in a seatable state in FIG. 1, and the second seat 40 is in a cargo mountable state in FIG. 2. FIG. 3 is a schematic cross-sectional view taken along the line III-III in FIG. 1. In FIG. 3, positions of the rear wheels 12 and the backrest 52 in plan view are indicated by alternate long and two short dashes lines. FIG. 4 is a perspective view illustrating one side portion of the second seat 40.

The second seat 40 is changeable to a seat state and a cargo bed state. The seat state is a state in which an occupant can be seated. The cargo bed state is a state in which cargo is mountable.

More specifically, the seat base 42 includes a main base 43 and an extension base 46.

The main base 43 is formed to have a horizontally extending flat shape. The main base 43 may be formed to be long in the left-right direction so that the seat 51 in a width direction as a whole can be supported from below. The main base 43 is supported by the above-mentioned seat support frame 54 at a position above the floor 22, for example.

In the present embodiment, the main base 43 includes a bottom plate 44 and a wall 45. The bottom plate 44 is formed to have a plate-like shape, for example, a rectangular plate-like shape. The wall 45 extends upward from left and right edges and a rear edge of the bottom plate 44. A space above the bottom plate 44 is thus surrounded by the wall 45 from left, right, and behind. The wall 45 may be omitted.

A surface of the main base 43 facing upward is a mounting surface 43F on which the cargo is mounted. In the present embodiment, an upward-facing surface of the bottom plate 44 surrounded by the wall 45 is the mounting surface 43F.

A left-right width of the main base 43 may be set to be approximately the same as or larger than a left-right width of the seat 51. In the present embodiment, the left-right width of the main base 43 is set to be approximately the same as the left-right width of the seat 51. Left and right side portions of the seat 51 can be arranged as an extension above left and right portions of the wall 45 of the main base 43.

A front-rear length of the main base 43 may be set to be the same as or larger than a front-rear length of the seat 51. In the present embodiment, the front-rear length of the main base 43 is set to be larger than the front-rear length of the seat 51. In plan view, the front of the seat 51 is disposed along a front edge of the main base 43, and the rear of the main base 43 extends rearward of the seat 51.

The extension base 46 is formed to have a flat shape. The extension base 46 may be formed to be horizontally long so that the bottom of the seat 51 can be supported.

In the present embodiment, one side of the extension base 46 includes a main plate 47 and a wall 48. The main plate 47 is formed to have a plate-like shape, for example, a rectangular plate-like shape. The wall 48 extends from left and right edges of the main plate 47 and one of edges crossing the left and right edges in a direction crossing the main plate 47. A space extending above one main surface of the main plate 47 is thus surrounded on three sides by the wall 48. The wall 48 may be omitted.

One main surface of the extension base 46 is a mounting surface 46F1 on which the cargo is mounted. In the present embodiment, a surface of the main plate 47 surrounded by the wall 48 is the mounting surface 46F1. The other main surface of the extension base 46 is a seat mounting surface 46F2 on which the seat 51 is disposed. The mounting surface 46F1 and the seat mounting surface 46F2 are surfaces facing away from each other.

A left-right width of the extension base 46 may be set to be approximately the same as or smaller or larger than the left-right width of the main base 43. In the present embodiment, the left-right width of the extension base 46 is set to be approximately the same as the left-right width of the main base 43. The extension base 46 can thus be disposed within the left and right portions of the wall 45 of the main base 43. The left-right width of the extension base 46 is set to be approximately the same as the left-right width of the seat 51.

The left and right side portions of the seat 51 can be arranged as an extension of left and right portions of the wall 48 of the extension base 46.

A front-rear length of the extension base 46 may be set to be the same as or larger or smaller than the front-rear length of the main base 43. In the present embodiment, the front-rear length of the extension base 46 is set to be smaller than the front-rear length of the main base 43. In plan view, the front and the rear of the extension base 46 as a whole can be disposed within the main base 43.

The extension base 46 is supported to be movable between an unfolded position and a folded position.

The unfolded position is a position at which the extension base 46 is unfolded with respect to another component of the wheeled vehicle 10 as illustrated in FIG. 2. The folded position is a position at which the extension base 46 is folded with respect to the other component as illustrated in FIG. 1.

More specifically, the unfolded position is a position at which the extension base 46 is unfolded with respect to the main base 43. The folded position is a position at which the extension base 46 is folded with respect to the main base 43.

In a case where it is understood that the extension base 46 as one example of a fixing supporter is supported to be movable between a first position and a second position, one example of the first position is the unfolded position, and one example of the second position is the folded position.

In plan view, the folded extension base 46 overlaps the main base 43. In present embodiment, the folded extension base 46 as a whole overlaps the main base 43. At least portion of the folded extension base may overlap the main base.

In plan view, the unfolded extension base 46 extends in a different region from the main base 43. In the present embodiment, the unfolded extension base 46 as a whole extends in a different region from the main base 43. At least portion of the unfolded extension base is only required to extend in a different region from the main base.

That is to say, a region in which the extension base 46 overlaps the main base 43 is only required to be smaller at the unfolded position than at the folded position. Alternatively, a region in which the main base 43 and the extension base 46 extend is only required to be larger at the unfolded position than at the folded position.

In the present embodiment, the extension base 46 is connected to the front edge of the main base 43 via a hinge 49. The wall 48 of the extension base 46 is located at three edges of the main plate 47 excluding an edge at which the hinge 49 is disposed, that is, left and right edges and an edge opposite the hinge 49.

With the extension base 46 being disposed at the folded position, the extension base 46 overlaps the main base 43. In this state, the wall 48 extends downward from the edges of the main plate 47. The left-right width of the extension base 46 is smaller than the left-right width of the main base 43, so that the extension base 46 is disposed within the left and right portions of the wall 45 of the main base 43. In this state, the seat mounting surface 46F2 of the main plate 47 opposite the main base 43 faces upward. The seat 51 is threadably fixed to the seat mounting surface 46F2, for example. The seat 51 is thus located on the seat base 42. An occupant can be seated on the seat 51.

With the extension base 46 being disposed at the unfolded position, the extension base 46 extends forward of the main base 43. In this state, the main plate 47 extends forward of the bottom plate 44. The main plate 47 is preferably disposed at vertically the same position as the bottom plate 44. However, there may be a step between the main plate 47 and the bottom plate 44.

With the extension base 46 being disposed at the unfolded position, the wall 48 extends upward from the left and right edges and a front edge of the main plate 47. A space above the bottom plate 44 and an unfolded portion of the main plate 47 is thus surrounded by the walls 45 and 48 from left and right and ahead and behind.

In this state, the seat mounting surface 46F2 of the main plate 47 faces downward. The seat 51 is located below the seat mounting surface 46F2 and is located between the main base 43 and the first seat 30. The seat 51 is located rearward of the driver seat 30D both in a case where the extension base 46 is disposed at the unfolded position and a case where the extension base 46 is disposed at the folded position.

The armrest 60 is threadably fixed to opposite side portions of the extension base 46 and the seat 51, for example. With the extension base 46 being disposed at the folded position, the armrest 60 protrudes upward from the opposite side portions of the extension base 46 and the seat 51. With the extension base 46 being disposed at the unfolded position, the armrest 60 protrudes downward from the opposite side portions of the extension base 46 and the seat 51. A portion of the armrest 60 located farthest from the seating surface of the seat 51 in this state is disposed on the floor 22. The armrest 60 can thus support the extension base 46 at a certain height position upward away from the floor 22.

With the extension base 46 being located at the unfolded position, the mounting surface 46F1 faces upward. The cargo can be mounted on the mounting surface 46F1 facing upward. The extension base 46 is thus one example of a cargo bed. A combined unit of the extension base 46 and the seat 51 may be understood as one example of the cargo bed.

Figure 5:
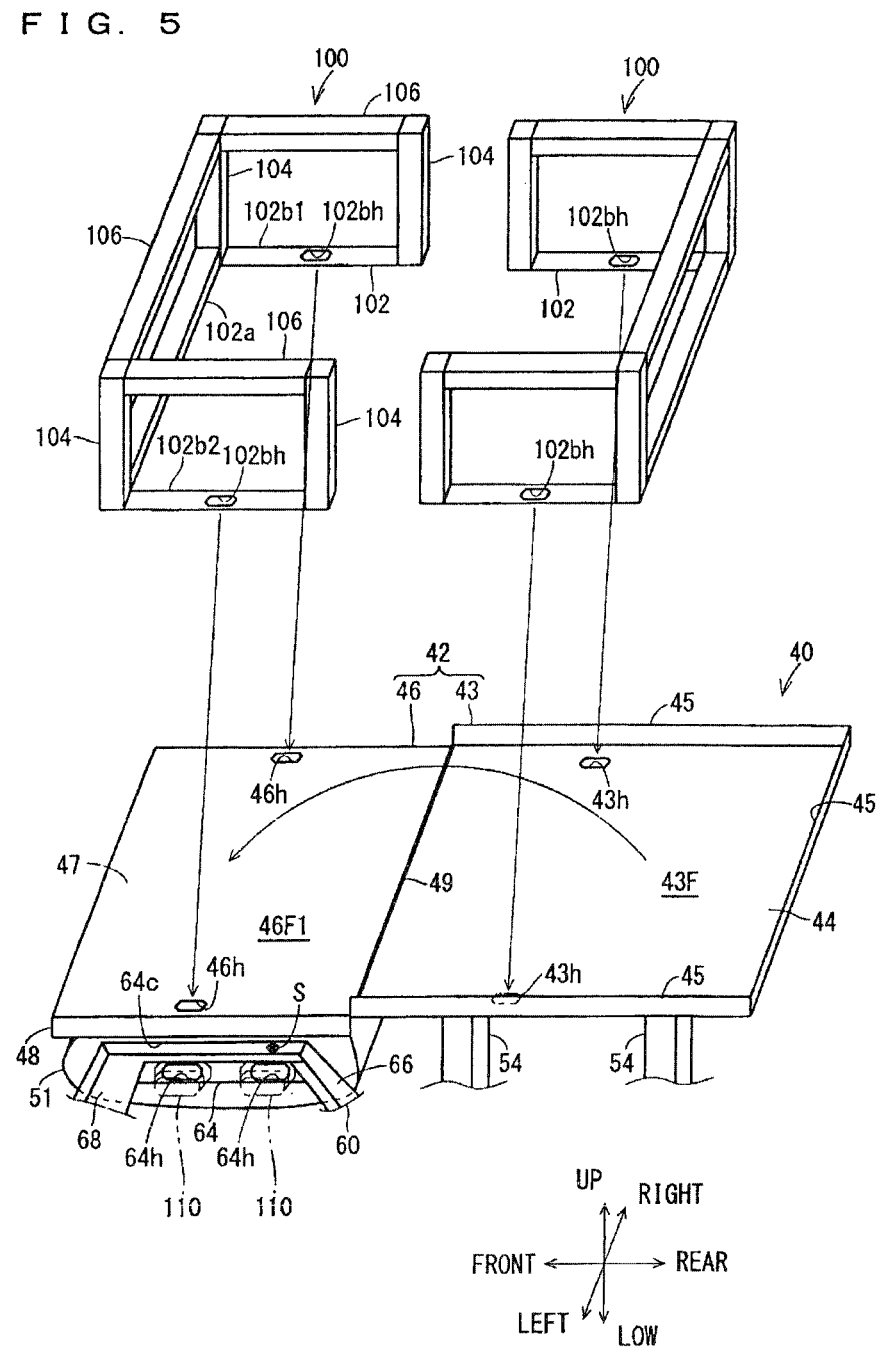

FIGS. 5 and 6 are schematic perspective views each illustrating a state of the extension base 46 being disposed at the unfolded position. FIG. 5 illustrates a fixing object 100 before being fixed. FIG. 6 illustrates the fixing object 100 having been fixed.

Fixing holes 43h are formed in the main base 43. The fixing holes 43h are holes to fix the fixing object 100 to the main base 43. The main base 43 is one example of the fixing supporter to which the fixing object 100 is fixed and which includes the fixing holes 43h to fix the fixing object 100.

In the present embodiment, the fixing holes 43h are formed in the middle in the front-rear direction of left and right portions of the bottom plate 44 of the main base 43. The fixing holes 43h are holes extending through the bottom plate 44. The fixing holes 43h are holes shaped to allow passage of retaining parts 114 of clamps 110, which will be described below, but not to allow passage of bases 112 of the clamps 110. In the present embodiment, the fixing holes 43h are elongated holes.

Fixing holes 46h are formed in the extension base 46. The fixing holes 46h are holes to fix the fixing object 100 to the extension base 46. The extension base 46 is one example of the fixing supporter to which the fixing object 100 is fixed and which includes the fixing holes 46h to fix the fixing object 100. The main base 43 may be understood as a fixing fixed position supporter, and the extension base 46 may be understood as a fixing movable supporter.

In the present embodiment, the fixing holes 46h are formed in the middle in the front-rear direction of left and right portions of the main plate 47 of the extension base 46. The fixing holes 46h are holes extending through the main plate 47. The fixing holes 46h may have the same shape as the above-mentioned fixing holes 43h.

With the extension base 46 as one example of the fixing supporter being located at the unfolded position as one example of the first position, a space extends above the mounting surface 46F1. Openings of the fixing holes 46h formed in the main plate 47 on a side of the mounting surface 46F1 are thus open to an external space in this state. With the extension base 46 as the cargo bed being located at the unfolded position, the fixing object 100 can be fixed to the extension base 46 using the clamps 110.

With the extension base 46 being located at the folded position as one example of the second position, the main base 43 as a component of the wheeled vehicle 10 is located outward of the openings of the fixing holes 46h formed in the main plate 47 on a side of the mounting surface 46F1. In other words, with the extension base 46 as the cargo bed being located at the folded position, the extension base 46 is folded over the main base 43 as the component of the wheeled vehicle 10.

In a case where the clamps 110, which will be described below, are attached to the fixing holes 46h, the clamps 110 do not interfere with the main base 43 with the extension base 46 being located at the unfolded position but interfere with the main base 43 with the extension base 46 being located at the folded position. It is thus difficult to move the extension base 46 to the folded position with the clamps 110 being attached to the extension base 46.

The fixing object 100 is an object fixed to the main base 43 or the extension base 46. In the present embodiment, an example in which the fixing object 100 is a partition separating a space above the mounting surfaces 43F and 46F1 from an outside so that an object mounted on the main base 43 or the extension base 46 does not fall out is described. More specifically, the fixing object 100 is a fence covering at least portion of a space above the mounting surfaces 43F and 46F1.

The fence 100 includes a fence base 102, fence props 104, and a crossbar 106.

The fence base 102 is a portion located at the bottom of the fence 100 and mounted on the mounting surfaces 43F and 46F1. In the present embodiment, the fence base 102 includes an intermediate base portion 102a, a first lateral base portion 102b1, and a second lateral base portion 102b2. The first lateral base portion 102b1 and the second lateral base portion 102b2 protrude parallel to each other from opposite ends of the intermediate base portion 102a in the same direction.

The first lateral base portion 102b1 and the second lateral base portion 102b2 are each formed to have an elongated plate-like shape. A fixing hole 102bh through which a retaining part 114 of a clamp 110 can pass but a base 112 of the clamp 110 cannot pass is formed in the middle in a direction of extension of each of the first lateral base portion 102b1 and the second lateral base portion 102b2. The fixing hole 102bh may have the same shape as the fixing holes 43h and 46h.

Spacing between the first lateral base portion 102b1 and the second lateral base portion 102b2 are set to have a size corresponding to spacing between the two fixing holes 43h of the main base 43 or spacing between the two fixing holes 46h of the extension base 46. The first lateral base portion 102b1 and the second lateral base portion 102b2 are arranged on the respective two fixing holes 43h of the main base 43, so that two fixing holes 102bh can be arranged on the respective two fixing holes 43h. Similarly, the first lateral base portion 102b1 and the second lateral base portion 102*b*2 are arranged on the respective two fixing holes 46*h* of the extension base 46, so that two fixing holes 102*bh* can be arranged on the respective two fixing holes 46*h*.

The fence props 104 are elongated portions extending upward from the fence base 102. For example, the fence props 104 extend from leading ends of the first lateral base portion 102*b*1 and the second lateral base portion 102*b*2 and opposite ends of the intermediate base portion 102*a*. The fence props 104 extend in the same direction crossing each of the first lateral base portion 102*b*1, the second lateral base portion 102*b*2, and the intermediate base portion 102*a*. With the fence base 102 being fixed to the mounting surfaces 43F and 46F1, the fence props 104 are provided to stand on the mounting surfaces 43F and 46F1.

The crossbar 106 is supported by the fence props 104 at a position away from the fence base 102. The crossbar 106 crosses the fence props 104 and is preferably orthogonal to the fence props 104. In the present embodiment, the crossbar 106 is supported by upper ends of the fence props 104 and spans between the fence props 104. The crossbar may be supported in the middle in a direction of extension of the fence props.

An example in which the fence 100 is a common part shared by the main base 43 and the extension base 46 has been described in the above-mentioned example. However, a fence for the main base 43 and a fence for the extension base 46 may be prepared as separate parts. In this case, the separate fences may differ in lengths of the first lateral base portion and the second lateral base portion.

The fixing object is not required to be the fence 100. For example, the fixing object may be a hook to which rope to fix the cargo can be tied or on which the rope can be hung. The fixing object may be a part designed to fix a particular transporting object, such as a bicycle, to the main base 43 or the extension base 46.

One example of the clamp 110 to fix the fence 100 to the main base 43 or the extension base 46 will be described.

The clamp 110 is attached to and detached from each of the fixing holes 43*h* and 46*h* by quick operation. Quick operation is herein operation simpler than thread fastening operation or thread unfastening operation and is a combination of two unidirectional operations or one unidirectional operation, for example. The unidirectional operation is operation in one direction unaccompanied by returning operation and may be rotational operation, pushing operation, pulling operation, pushing-up operation, pushing-up operation, and lateral movement operation. For example, rotational operation in one direction unaccompanied by returning operation is operation that can be performed by one twist of the wrist and is rotational operation of 180° or less, for example. Quick operation is preferably operation that can be performed without using any tool but is not necessarily required to be operation that can be performed without using any tool. For example, quick operation may be performed using a tool having a key function.

For example, as illustrated in FIGS. 3 and 4, the clamp 110 includes the base 112, the retaining part 114, a shaft 116, and an operating part 118.

The base 112 is sized to be impassable through each of the fixing holes 43*h* and 46*h* regardless of an orientation relative to each of the fixing holes 43*h* and 46*h*. For example, the base 112 is sized to be longer than a direction of extension of each of the elongated fixing holes 43*h* and to be thicker than a width of each of the fixing holes 43*h*.

The retaining part 114 is sized to be passable or impassable through each of the fixing holes 43*h* and 46*h* depending on the orientation relative to each of the fixing holes 43*h* and 46*h*. For example, the retaining part 114 is sized to be long along the direction of extension of each of the elongated fixing holes 43*h* and 46*h* and to be smaller than each of the elongated fixing holes 43*h* and 46*h*. The length of the retaining part 114 is larger than the width of each of the elongated fixing holes 43*h* and 46*h*. With a direction of extension of the retaining part 114 being oriented along the direction of extension of each of the fixing holes 43*h* and 46*h*, the retaining part 114 can pass through each of the fixing holes 43*h* and 46*h*. With the direction of extension of the retaining part 114 being oriented to cross the direction of extension of each of the fixing holes 43*h* and 46*h*, the retaining part 114 cannot pass through each of the fixing holes 43*h* and 46*h*.

The shaft 116 connects the base 112 and the retaining part 114 to be rotatable relative to each other. The retaining part 114 is rotatable relative to the base 112 around a central axis of the shaft 116. There is a gap between the base 112 and the retaining part 114. The gap is sized so that a peripheral edge of each of the fixing holes 43*h* of the main base 43 and the fixing holes 46*h* of the extension base 46 and a peripheral edge of each of the fixing holes 102*bh* of the fence base 102 of the fence 100 can be sandwiched.

The retaining part 114 may be urged toward the base 112 by an urging member 117, such as a spring. Spacing between the retaining part 114 and the base 112 is thus adjusted depending on a thickness of a portion to be sandwiched between the base 112 and the retaining part 114.

The operating part 118 is located opposite the retaining part 114 with the base 112 therebetween. That is to say, the base 112 is located between the operating part 118 and the retaining part 114. The operating part 118 is connected not to be rotatable relative to the shaft 116. The operating part 118 may have an elongated shape to facilitate rotational operation. The operating part 118 is rotated around the central axis of the shaft 116 relative to the base 112 to rotate the retaining part 114 around the central axis of the shaft 116 relative to the base 112.

For example, in an attachable and detachable state, the retaining part 114 extends along a direction of extension of the base 112, and the operating part 118 extends to cross the direction of extension of the base 112. In this state, the retaining part 114 passes through each of the fixing holes 102*bh* and the fixing holes 43*h* and 46*h* and is disposed opposite the base 112.

The operating part 118 is then rotated to cause the retaining part 114 to extend to cross the direction of extension of the base 112 and to cause the operating part 118 to extend along the direction of extension of the base 112. The retaining part 114 can thus no longer pass through each of the fixing holes 102*bh* and the fixing holes 43*h* and 46*h*, and the base 112 and the retaining part 114 sandwich the peripheral edge of each of the fixing holes 43*h* of the main base 43 and the fixing holes 46*h* of the extension base 46 and the peripheral edge of each of the fixing holes 102*bh* of the fence base 102 of the fence 100. The fence 100 is thus fixed to the main base 43 or the extension base 46 using the clamp 110.

That is to say, the operating part 118 is a part to operate the retaining part 114 to a state in which the retaining part 114 is passable through each of the fixing holes 43*h*, 46*h*, and 102*bh* and a state in which the retaining part 114 is retained from each of the fixing holes 43*h*, 46*h*, and 102*bh*.

To hold the above-mentioned fixing state, one of the base 112 and the operating part 118 may have a protrusion 112*a*, and the operating part 118 may have a recess 118*a* into which the protrusion 112*a* fits. The protrusion 112*a* fits into the recess 118*a* in the fixing state to suppress rotation of the operating part 118 and the retaining part 114 relative to the base 112 and maintain the fixing state.

The clamp 110 is attached to and detached from each of standby holes 64*h* similarly to the foregoing.

The wheeled vehicle 10 includes a standby supporter disposed at a different position from the main base 43 or the extension base 46 as one example of the fixing supporter and including the standby holes 64*h*. The standby holes 64*h* are holes through each of which the retaining part 114 of the clamp 110 can pass but the base 112 of the clamp 110 cannot pass. The standby holes 64*h* may have the same shape as the fixing holes 43*h*, 46*h*, and 102*bh*.

The standby holes 64*h* and the standby supporter may be located at any positions as long as they are arranged at different positions from the main base 43 or the extension base 46.

In the present embodiment, an example in which the standby supporter is the armrest 60 located next to the extension base 46 as one example of the fixing supporter will be described.

More specifically, the armrest 60 includes an armrest body 62, an attachment base 64, a first rest support column 66, and a second rest support column 68.

The armrest body 62 is a portion an occupant as a user touches. More specifically, the armrest body 62 is a portion on which an occupant as a user seated on the second seat 40 is contemplated to place his/her elbow in a normal seated orientation. It is contemplated that the armrest body 62 is located outward in the vehicle width direction of the seat 51 above the seat 51. It is also contemplated that the armrest body 62 is elongated and extends along the front-rear direction.

The attachment base 64 is a portion attached to the combined unit of the extension base 46 as one example of the fixing supporter and the seat 51 at a position downward away from the armrest body 62. The attachment base 64 may be attached only to the extension base 46 or may be attached to both the extension base 46 and the seat 51. The attachment base 64 may be attached to the extension base via the seat.

The attachment base 64 includes a plate 64*a* facing outward in the vehicle width direction and a wall 64*b* extending inward in the vehicle width direction from an upper edge of the plate 64*a*. The attachment base 64 is attached to the extension base 46 with screws S and the like (see FIG. 5).

The plate 64*a* crosses a horizontal direction. The plate 64*a* is herein located outward in the left-right direction of the extension base 46 and extends in a direction orthogonal to the left-right direction. The plate 64*a* covers a right or left surface of the seat 51 from outside in the vehicle width direction. Due to the wall 64*b* and the rest support columns 66 and 68 connected to front and rear ends of the plate 64*a*, the plate 64*a* is disposed at a position outward away from the right or left surface of the seat 51 in the vehicle width direction. A space S1 is thus formed inward in the vehicle width direction of the plate 64*a* with the attachment base 64 being attached (see FIG. 4). The space S1 is a retaining space S1 which is located between the combined unit of the extension base 46 as one example of the fixing supporter and the seat 51 and an outward-facing portion of the attachment base 64 and in which the retaining part 114 is locatable.

The standby holes 64*h* are formed in the attachment base 64. More specifically, the standby holes 64*h*, herein, two standby holes 64*h* are formed in the plate 64*a*. The two standby holes 64*h* are located at intervals in the front-rear direction. The plate 64*a* extends along the front-rear direction and the vertical direction, so that the standby holes 64*h* formed in the plate 64*a* face outward in the vehicle width direction. Since the fixing holes 46*h* face downward or upward as described above, the standby holes 64*h* are open in a different direction from the fixing holes 46*h*. The standby holes 64*h* are formed in the armrest 60 for the second seat 40 and are thus located rearward of the driver seat 30D.

The attachment base 64 is located outward of a right or left side surface of each of the extension base 46 and the seat 51 and is disposed below an upward-facing seating surface 51*f* of the seat 51. The standby holes 64*h* formed in the attachment base 64 are also arranged below the seating surface 51*f*. A height position Lh of the seating surface 51*f* in this state is determined based on a state in which an occupant can be seated on the seat 51, that is, a state in which the extension base 46 is disposed at the folded position (see FIG. 1).

The first rest support column 66 and the second rest support column 68 protrude upward from the attachment base 64 and support the armrest body 62 at a position opposite the attachment base 64. In the present embodiment, the first rest support column 66 and the second rest support column 68 extend obliquely upward and rearward of the attachment base 64. The armrest body 62 is supported by upper ends of the first rest support column 66 and the second rest support column 68 in an orientation along the front-rear direction.

A proximal end of the first rest support column 66 and a proximal end of the second rest support column 68 protrude to a side to which the standby holes 64*h* are open relative to the attachment base 64, that is, outward in the vehicle width direction. The above-mentioned plate 64*a* is thus located, between the proximal end of the first rest support column 66 and the proximal end of the second rest support column 68, inward in the vehicle width direction of the proximal ends. As described above, the standby holes 64*h* are formed in a portion of the attachment base 64 between the first rest support column 66 and the second rest support column 68. The standby holes 64*h* are thus located inward in the vehicle width direction of the proximal end of the first rest support column 66 and the proximal end of the second rest support column 68.

The attachment base 64 has a protruding portion 64*c* protruding outward in the vehicle width direction of the plate 64*a* below the plate 64*a*. The plate 64*a* and the standby holes 64*h* formed in the plate 64*a* are located inward in the vehicle width direction of the protruding portion 64*c*. The standby holes 64*h* are thus surrounded on three sides by the proximal end of the first rest support column 66, the proximal end of the second rest support column 68, and the protruding portion 64*c*.

As described above, the standby holes 64*h* may be located at any positions not limited to those in the above-mentioned example as long as they are arranged at different positions from the main base 43 and the extension base 46.

When the armrest 60 as one example of the standby supporter and the standby holes 64*h* are located next to the extension base 46 as one example of the cargo bed, it is easy to detach the clamp 110 attached to each of the standby holes 64*h* and attach the clamp 110 to the extension base 46 close to the standby holes 64*h*. It is also easy to detach the clamp 110 attached to each of the fixing holes 46*h* and attach the clamp 110 to each of the standby holes 64*h* close to the fixing holes 46*h*.

One example of a method of operating the clamp 110 for the wheeled vehicle 10 will be described.

In a case where the second seat 40 is used as the cargo bed on which the cargo is mounted, the extension base 46 is disposed at the unfolded position (see FIGS. 2, 5, and 6). The mounting surface 43F of the main base 43 faces upward, and the mounting surface 46F1 of the extension base 46 faces upward at a position adjacent to the mounting surface 43F. The fence 100 is fixed to each of the main base 43 and the extension base 46. Specifically, the fixing holes 102bh of the fence base 102 are arranged on the fixing holes 43h of the main base 43 and the fixing holes 46h of the extension base 46. In this state, the retaining part 114 of the clamp 110 passes through each of the fixing holes 102bh, 43h, and 46h and then fixed to each of the fixing holes 102bh, 43h, and 46h for retention by quick operation on the operating part 118. The fence 100 is thus fixed to each of the main base 43 and the extension base 46 using the clamp 110.

In a case where the second seat 40 is used as the seat for occupants, the extension base 46 is folded at the folded position (see FIGS. 1 and 4). In this case, the fence 100 is detached from each of the main base 43 and the extension base 46. The clamp 110 used to fix the fence 100 can also be used to fix the fixing object other than the fence 100. It is thus considered that the clamp 110 is preferably held on standby not at the fence 100 but at the wheeled vehicle 10.

Assume that the clamp 110 is held on standby by the fixing holes 43h of the main base 43 and the fixing holes 46h of the extension base 46 in this case. In this case, the clamp 110 protrudes from the mounting surfaces 43F and 46F1. Thus, when the extension base 46 is folded at the folded position, the clamp 110 in the main base 43 interferes with the extension base 46, and the clamp 110 in the extension base 46 interferes with the main base 43.

Thus, with the fence 100 being detached from the main base 43 and the extension base 46, the clamp 110 is attached to each of the standby holes 64h formed in the armrest 60 as the standby supporter by quick operation. The extension base 46 can thus be disposed at a standby position while the clamp 110 is held on standby at the wheeled vehicle 10. By disposing the extension base 46 at the standby position, the second seat 40 is used as the seat for occupants.

In this state, the standby holes 64h are open. The standby holes 64h may be closed by attachable and detachable covers 130 (see FIG. 4).

According to a structure to attach the clamp 110 for the vehicle 10 having a configuration as described above, the clamp 110 can be attached to each of the fixing holes 43h and 46h by quick operation to fix the fence 100 to the main base 43 and the extension base 46. In a case where the fence 100 is not fixed, the clamp 110 can be attached to each of the standby holes 64h by quick operation. Thus, in a case where the fence 100 is not fixed to the main base 43 and the extension base 46, a space extending above the mounting surface 43F of the main base 43 and the mounting surface 46F1 of the extension base 46 can effectively be used. For example, a space extending above the mounting surface 43F of the main base 43 can effectively be used as a space to dispose the extension base 46, and a space extending above the mounting surface 46F1 of the extension base 46 can effectively be used as a space to dispose the main base 43. The clamp 110 is less likely to be lost when being attached to each of the standby holes 64h.

Since the clamp 110 can be held on standby at the vehicle 10 itself, it is easy to access the clamp 110 when the fixing object is fixed to the main base 43 or the extension base 46.

The fixing holes 46h are open to the external space with the extension base 46 being located at the standby position as the first position, and the main base 43 as the component of the vehicle 10 is disposed outward of openings of the fixing holes 46h with the extension base 46 being located at the folded position as the second position. With the main base 43 as the component of the vehicle 10 being disposed outward of the openings of the fixing holes 46h, the clamp 110 can be attached to each of the standby holes 64h to suppress obstacles in a case where the extension base 46 is disposed at the second position.

When the main base 43 and the extension base 46 are the cargo bed, the fixing object, such as the fence 100, can be fixed to the main base 43 and the extension base 46 as the cargo bed using the clamp 110.

When the standby holes 64h are located next to the extension base 46 as the cargo bed, the clamp 110 not used for fixing can be held on standby at a position next to the cargo bed.

When the extension base 46 as the cargo bed is supported to be movable between the unfolded position and the folded position, the fixing object, such as the fence 100, can be fixed to the extension base 46 using the clamp 110 with the extension base 46 being located at the unfolded position, and the extension base 46 is folded over the main base 43 as the component of the vehicle with the extension base 46 being located at the folded position. The extension base 46 can thus easily be folded while interference of the clamp 110 is avoided.

With the extension base 46 and the seat 51 being understood to constitute the cargo bed, the cargo bed can be understood to include the seat 51 facing upward with the cargo bed being located at the folded position. The clamp 110 can thus be attached to each of the standby holes 64h less likely to prevent folding in a case where the cargo bed or the fixing supporter is used as the seat.

The extension base 46 may be moved separately from the seat 51. For example, the extension base may be moved between the first position and the second position while the seat is maintained at a fixed position. For example, while the seat is maintained at the fixed position, the extension base may be slid relative to the seat to be moved between the first position outward of the seat and the second position at which the extension base overlaps the seat. Also in this case, the fixing object, such as the fence, may be fixed to the extension base using the clamp in a case where the extension base is located at the first position, and the clamp may be attached to each of the standby holes outward of the extension base in a case where the extension base is located at the second position.

When the standby holes 64h are located rearward of the driver seat 30D, the clamp 110 attached to each of the standby holes 64h is less likely to interfere with the driver.

The standby holes may not be located rearward of the driver seat. The standby holes may be located at a position other than the position rearward of the driver seat as long as the position is different from the position of the driver seat.

When the standby holes 64h are arranged below the seating surface 51f, interference of an occupant seated on the seat 51 with the clamp 110 attached to each of the standby holes 64h can be prevented.

The standby holes 64h are open in a different direction from the fixing holes 43h and 46h. The standby holes 64h and the fixing holes 43h and 46h herein have certain extents. Wide areas for installation might thus be required when the standby holes 64h and the fixing holes 43h and 46h are open in the same direction. When the standby holes 64h are open in a different direction from the fixing holes 43h and 46h, spaces for arrangement of the holes 43h, 46h, and 64h are more likely to be secured compared with a case where the standby holes 64h and the fixing holes 43h and the 46h are open in the same direction. For example, the spaces for arrangement of the standby holes 64h are more likely to be secured when the standby holes 64h are open transverse to the plate 64a.

Raindrops and the like falling to the standby holes 64h are less likely to enter the standby holes 64h when the standby holes 64h are open horizontally.

Since the standby holes 64h are formed in the armrest 60 located next to the extension base 46, the clamp 110 not used for fixing near the extension base 46 can be supported using the armrest 60. The clamp 110 is not required to be stored in a storage box, so that a storing space of the storage box can effectively be used.

The fixing supporter can be understood to include the extension base 46 and the seat 51, and the seat 51 is located rearward of the driver seat 30D. There can be a great need to reduce the front-rear length of the armrest 33 on a side of the driver seat 30D for entry and exit of an occupant. In contrast, as for the second seat 40, the presence of the steering wheel 13 and the like is not required to be considered, and entry and exit to and from a side rearward of the second seat 40 are not required to be considered. The armrest 60 on a rear side can thus be more likely to be increased than the armrest 33 on a front side. The standby holes 64h for the clamp 110 can easily be provided to the armrest 60 for the second seat 40 more likely to be increased.

The clamp 110 can be supported by the armrest 60 located near the extension base 46 both in a case where the fixing object, such as the fence 100, is fixed to the extension base 46 and in a case where the seat 51 on the extension base 46 is used as the seat.

The standby holes 64h are formed in the attachment base 64 of the armrest 60, so that the clamp 110 can be maintained at a position away from the armrest body 62. The standby holes 64h can thus be provided at a position less likely to be touched with a hand to hold the armrest 60, and an occupant is less likely to touch the clamp 110 held on standby by each of the standby holes 64h.

The standby holes 64h are formed in a withdrawn portion between the proximal end of the first rest support column 66 and the proximal end of the second rest support column 68, and the standby holes 64h can be provided at a position less likely to be touched with the hand to hold the armrest 60. An occupant is thus less likely to touch the clamp 110 held on standby by each of the standby holes 64h.

The retaining space S1 in which the retaining part 114 is locatable is formed between the plate 64a as the outward-facing portion of the attachment base 64 and the seat 51. The clamp 110 can thus be fixed to the attachment base 64 using the retaining space S1.

The plate 64a in which the standby holes 64h are formed crosses the horizontal direction. The plate 64a in which standby holes 64h are formed can thus be installed in a compact region in plan view.

The clamp 110 includes the base 112, the retaining part 114, the shaft 116, and the operating part 118 to operate retaining part 114. The clamp 110 can thus easily be attached to and detached from each of the fixing holes 43h, 46h, and 102bh and the standby holes 64h by operation of the operating part 118.

When the vehicle 10 is the wheeled vehicle 10, the clamp 110 can conveniently be used for the wheeled vehicle 10.

The clamp 110 is operated as described below. First, with the fence 100 being fixed to the main base 43 or the extension base 46, the clamp 110 is attached to each of the fixing holes 43h and 46h by quick operation to fix the fence 100 to the main base 43 or the extension base 46 using the clamp 110.

With the fence 100 being detached from the main base 43 or the extension base 46, the clamp 110 is attached to each of the standby holes 64h formed in the armrest 60 by quick operation.

The fence 100 can thus easily be fixed to the main base 43 or the extension base 46 by attaching the clamp 110 to each of the fixing holes 43h and 46h by quick operation. With the fence 100 being detached from the main base 43 or the extension base 46, the clamp 110 can be attached to each of the standby holes 64h by quick operation after being detached from each of the fixing holes 43h and 46h by quick operation. In a case where the fence 100 is easily fixed to the main base 43 or the extension base 46 again from this state, the clamp 110 can be attached to each of the fixing holes 43h and 46h by quick operation to fix the fence 100 after being detached from each of the standby holes 64h by quick operation.

Work to attach and detach the fence 100 to and from the main base 43 or the extension base 46 can thus easily be performed. In a case where the fence 100 is not fixed to the main base 43 or the extension base 46, a space extending above the mounting surface 43F of the main base 43 or the mounting surface 46F1 of the extension base 46 can effectively be used. For example, the space extending above the mounting surface 43F of the main base 46 or the mounting surface 46F1 of the extension base 46 can effectively be used as a space for arrangement thereof, and the extension base 46 can overlap the main base 43 by being folded over the main base 43.

The clamp 110 is less likely to be lost when being attached to each of the standby holes 64h.

The present application discloses the following aspects.

A first aspect is a clamp attachment structure for a vehicle, wherein the vehicle includes a fixing supporter to which a fixing object is fixed and a standby supporter disposed at a different position from the fixing supporter, the fixing supporter including a fixing hole to fix the fixing object, the standby supporter including a standby hole, and a clamp is attached to and detached from the fixing hole or the standby hole by quick operation.

According to the clamp attachment structure, the clamp can be attached to the fixing hole by quick operation to fix the fixing object to the fixing supporter. In a case where the fixing object is not fixed, the clamp can be attached to the standby hole by quick operation. The space extending above a supporting surface of the fixing supporter can thus effectively be used in a case where the fixing object is not fixed to the fixing supporter. Furthermore, the clamp is less likely to be lost when being attached to the standby hole.

As in a second aspect, the fixing supporter may be supported to be movable between a first position and a second position, with the fixing supporter being located at the first position, the fixing hole may be open to an external space, and, with the fixing supporter being located at the second position, a component of the vehicle may be disposed forward of an opening of the fixing hole.

In this case, the clamp can be attached to the standby hole when the clamp attached to the fixing hole interferes with the component of the vehicle with the fixing supporter being located at the second position.

As in a third aspect, the fixing supporter may be a cargo bed.

The fixing object can thus be fixed to the cargo bed using the clamp.

As in a fourth aspect, the standby supporter may be located next to the cargo bed.

The clamp not used for fixing can thus be held at the position next to the cargo bed.

As in a fifth aspect, the cargo bed may be supported to be movable between an unfolded position and a folded position, with the cargo bed being located at the unfolded position, the fixing object may be fixable to the cargo bed using the clamp, and, with the cargo bed being located at the folded position, the cargo bed may be folded over a component of the vehicle.

The cargo bed is thus easily folded while interference of the clamp is avoided.

As in a sixth aspect, the cargo bed may include a seat facing upward with the cargo bed being located at the folded position.

The clamp is thus attached at a position suitable for fixing or standby in a case where the fixing supporter is used as the cargo bed and the seat.

As in a seventh aspect, the vehicle may include a driver seat, and the standby hole may be located rearward of the driver seat.

As in an eighth aspect, the standby hole may be disposed below a seating surface of the vehicle.

Interference of an occupant seated on the seat with the clamp located at the standby position can thus be prevented.

As in a ninth aspect, the standby hole may be open in a different direction from the fixing hole.

A space for arrangement of the standby hole is thus more likely to be secured compared with a case where the standby hole and the fixing hole are open in the same direction.

As in a tenth aspect, the standby supporter may be an armrest located next to the fixing supporter.

The clamp not used for fixing near the fixing supporter can thus be supported using the armrest.

As in an eleventh aspect, the vehicle may include a driver seat, and the fixing supporter may include a seat located rearward of the driver seat in this case.

There can be a great need to reduce a front-rear length of the armrest for the driver seat for entry and exit of an occupant to and from a side forward or rearward of the driver seat. In contrast, there can be a smaller need to reduce a front-rear length of the armrest located next to the fixing supporter including the seat located rearward of the driver seat than the need to reduce the front-rear length of the armrest for the driver seat. The standby hole can thus easily be provided to the armrest rearward of the driver seat having a front-rear length more likely to be increased.

As in a twelfth aspect, the fixing supporter may be supported to be movable between an unfolded position and a folded position, with the fixing supporter being located at the unfolded position, the fixing object may be fixable to the fixing supporter using the clamp, with the fixing supporter being located at the folded position, the fixing supporter may be folded over a component of the vehicle, and the fixing supporter may include a seat facing upward with the fixing supporter being located at the folded position.

The clamp can thus be supported by the armrest located near the fixing supporter both in a case where the fixing object is fixed to the fixing supporter and in a case where the fixing supporter is used as the seat.

As in a thirteenth aspect, the armrest may include an armrest body a user touches and an attachment base attached to the fixing supporter at a position away from the armrest body, and the standby hole may be formed in the attachment base.

The standby hole can thus be provided at a position less likely to be touched with a hand to hold the armrest.

As in a fourteenth aspect, the armrest may include a first rest support column and a second rest support column protruding from the attachment base and supporting the armrest body at a position opposite the attachment base, a proximal end of the first rest support column and a proximal end of the second rest support column may protrude to a side to which the standby hole is open relative to the attachment base, and the standby hole may be formed in a portion of the attachment base between the first rest support column and the second rest support column.

In this case, the standby hole is formed in the portion of the attachment base between the first rest support column and the second rest support column, so that the standby hole can be provided at the position less likely to be touched with the hand to hold the armrest.

As in a fifteenth aspect, the clamp may include a retaining part extending through the standby hole and retained at a peripheral edge of the standby hole of the standby supporter, and a retaining space in which the retaining part is locatable may be formed between an outward-facing portion of the attachment base and the fixing supporter.

The clamp can thus be attached to the attachment base using the retaining space.

As in a sixteenth aspect, the standby supporter may include a plate in which the standby hole is formed, and the plate may cross a horizontal direction.

The plate in which the standby hole is formed can thus be provided in a compact region in plan view.

As in a seventeenth aspect, the clamp may include a base, a retaining part, a shaft connecting the base and the retaining part, and an operating part to operate the retaining part to a state in which the retaining part is passable through the fixing hole or the standby hole and a state in which the retaining part is retained from the fixing hole or the standby hole.

The clamp can thus easily be attached and detached by operation of the operating part.

A clamp operation method according to an eighteenth aspect is a clamp operation method for a vehicle, wherein, with a fixing object being fixed to a fixing supporter, a clamp is attached to a fixing hole of the fixing supporter by quick operation to fix the fixing object to the fixing supporter using the clamp, and, with the fixing object being detached from the fixing supporter, the clamp is attached to a standby hole of a standby supporter by quick operation.

The clamp can thus be attached to the fixing hole by quick operation to fix the fixing object to the fixing supporter. With the fixing object being detached from the fixing supporter, the clamp can be attached to the standby hole by quick operation. The space extending above the supporting surface of the fixing supporter can thus effectively be used in a case where the fixing object is not fixed to the fixing supporter. Furthermore, the clamp is less likely to be lost when being attached to the standby hole.

The foregoing description is in all aspects illustrative and not restrictive. It is therefore understood that numerous unillustrated modifications can be devised without departing from the scope of the invention.

What is claimed is:

1. A clamp attachment structure for a vehicle, wherein
the vehicle includes a fixing supporter to which a fixing
object is fixed and a standby supporter disposed at a
different position from the fixing supporter, the fixing
supporter including a fixing hole to fix the fixing object,
the standby supporter including a standby hole, and a clamp is attached to and detached from the fixing hole or the standby hole, and wherein the fixing supporter is supported to be movable between a first position and a second position.

2. The clamp attachment structure for the vehicle according to claim 1, wherein with the fixing supporter being located at the first position, the fixing hole is open to an external space, and with the fixing supporter being located at the second position, a component of the vehicle is disposed forward of an opening of the fixing hole.

3. The clamp attachment structure for the vehicle according to claim 1, wherein the fixing supporter is a cargo bed.

4. The clamp attachment structure for the vehicle according to claim 3, wherein the standby supporter is located next to the cargo bed.

5. A clamp attachment structure for vehicle, wherein the vehicle includes a fixing supporter to which a fixing object is fixed and a standby supporter disposed at a different position from the fixing supporter, the fixing supporter including a fixing hole to fix the fixing object, the standby supporter including a standby hole, and a clamp is attached to and detached from the fixing hole or the standby hole, and wherein—the fixing supporter is a cargo bed, and wherein the cargo bed is supported to be movable between an unfolded position and a folded position, with the cargo bed being located at the unfolded position, the fixing object is fixable to the cargo bed using the clamp, and with the cargo bed being located at the folded position, the cargo bed is folded over a component of the vehicle.

6. The clamp attachment structure for the vehicle according to claim 5, wherein the cargo bed includes a seat facing upward with the cargo bed being located at the folded position.

7. The clamp attachment structure for the vehicle according to claim 1, wherein the vehicle includes a driver seat, and the standby hole is located rearward of the driver seat.

8. The clamp attachment structure for the vehicle according to claim 1, wherein the standby hole is disposed below a seating surface of the vehicle.

9. The clamp attachment structure for the vehicle according to claim 1, wherein the standby hole is open in a different direction from the fixing hole.

10. A clamp attachment structure for a vehicle, wherein the vehicle includes a fixing supporter to which a fixing object is fixed and a standby supporter disposed at a different position from the fixing supporter, the fixing supporter including a fixing hole to fix the fixing object, the standby supporter including a standby hole, and a clamp is attached to and detached from the fixing hole or the standby hole, and wherein the standby supporter is an armrest located next to the fixing supporter.

11. The clamp attachment structure for the vehicle according to claim 10, wherein the vehicle includes a driver seat, and the fixing supporter includes a seat located rearward of the driver seat.

12. The clamp attachment structure for the vehicle according to claim 10, wherein the fixing supporter is supported to be movable between an unfolded position and a folded position, with the fixing supporter being located at the unfolded position, the fixing object is fixable to the fixing supporter using the clamp, with the fixing supporter being located at the folded position, the fixing supporter is folded over a component of the vehicle, and the fixing supporter includes a seat facing upward with the fixing supporter being located at the folded position.

13. The clamp attachment structure for the vehicle according to claim 10, wherein the armrest includes an armrest body a user touches and an attachment base attached to the fixing supporter at a position away from the armrest body, and the standby hole is formed in the attachment base.

14. The clamp attachment structure for the vehicle according to claim 13, wherein the armrest includes a first rest support column and a second rest support column protruding from the attachment base and supporting the armrest body at a position opposite the attachment base, a proximal end of the first rest support column and a proximal end of the second rest support column protrude to a side to which the standby hole is open relative to the attachment base, and the standby hole is formed in a portion of the attachment base between the first rest support column and the second rest support column.

15. The clamp attachment structure for the vehicle according to claim 13, wherein the clamp includes a retaining part extending through the standby hole and retained at a peripheral edge of the standby hole of the standby supporter, and a retaining space in which the retaining part is locatable is formed between an outward-facing portion of the attachment base and the fixing supporter.

16. The clamp attachment structure for the vehicle according to claim 1, wherein the standby supporter includes a plate in which the standby hole is formed, and the plate crosses a horizontal direction.

17. The clamp attachment structure according to claim 1, wherein the clamp includes a base, a retaining part, a shaft connecting the base and the retaining part, and an operating part to operate the retaining part to a state in which the retaining part is passable through the fixing hole or the standby hole and a state in which the retaining part is retained from the fixing hole or the standby hole.

18. The clamp attachment structure for the vehicle according to claim 1, wherein the clamp is configured to be attached to and detached from the fixing hole or the standby hole by quick operation and wherein quick operation is a combination of two unidirectional operations or one unidirectional operation.

* * * * *